United States Patent [19]
Myers et al.

[11] Patent Number: 5,122,037
[45] Date of Patent: Jun. 16, 1992

[54] MANUAL DISPLACEMENT CONTROL

[75] Inventors: H. Allen Myers; Kerry Geringer, both of Ames, Iowa

[73] Assignee: Sauer, Inc., Ames, Iowa

[21] Appl. No.: 729,431

[22] Filed: Jul. 12, 1991

[51] Int. Cl.$^5$ ............................................. F04B 1/26
[52] U.S. Cl. .................................. 417/222 R; 60/389; 92/12.2
[58] Field of Search .......................... 91/407, 406, 405; 92/12.2; 60/389, 391, 403, 444, 443; 417/222 R

[56] References Cited

U.S. PATENT DOCUMENTS

| | | | |
|---|---|---|---|
| 3,212,263 | 10/1965 | Hann | 60/389 |
| 3,522,704 | 8/1970 | Martin | 60/389 |
| 3,911,792 | 10/1975 | Heyl et al. | 91/505 |
| 4,461,147 | 7/1984 | Myers | 60/389 |

FOREIGN PATENT DOCUMENTS 2620524 12/1977 Fed. Rep. of Germany ........ 91/506

Primary Examiner—Leonard E. Smith
Attorney, Agent, or Firm—Zarley, McKee, Thomte, Voorhees & Sease

[57] ABSTRACT

A manual displacement control is provided for varying the displacement of a hydraulic pump. The pump has a tiltable swashplate and is used in a hydraulic system which includes a control valve having an axially movable spool for metering control fluid to modulate the swashplate position. A displacement control linkage has a non-linear coupling element and a resilient override spring serially connected between the input lever and the valve spool. A torsional centering spring is connected between the input lever and the override spring to generate a feedback force which opposes a control force applied thereto and urges the input lever to a position representative of the no flow position of the pump swashplate. An adjustable connection is provided for centering the valve spool while maintaining a corresponding neutral position of the input lever and swashplate during assembly of the displacement control.

19 Claims, 3 Drawing Sheets

MANUAL DISPLACEMENT CONTROL

TECHNICAL FIELD

This invention relates to a manual displacement control for a variable displacement hydraulic pump and, more particularly, to a versatile control linkage having improved performance and assembly capabilities.

BACKGROUND ART

Conventional variable displacement hydraulic pumps have a rotating cylinder block with axially movable pistons which engage a tiltable swashplate for varying the stroke of the pistons. The displacement of the hydraulic pump is proportional to the stroke of the pistons within the cylinder block and, therefore, the tilt angle of the swashplate. When the swashplate is not tilted with respect to a "no flow" position, the pistons are not stroked and the pump has a zero displacement. The zero displacement position of the swashplate represents a neutral mode of operation of the pump.

In order to selectively prescribe the position of the swashplate, displacement controls are used to vary the swashplate position in response to a command input. Displacement controls take many forms, but in most cases they allow an operator to manually select a desired swashplate position and the corresponding hydraulic pump displacement.

Many displacement controls include a fluid-metering control valve having an axially movable spool which is displaced in response to a command input. Displacement of the valve spool away from an axially centered position results in the interconnection of output ports formed on the valve with a source of pressurized control fluid, such that the control fluid appropriately is metered to a servo mechanism for effecting an angular displacement of the swashplate. A command input typically is transmitted to the control valve through an input linkage having a remote manual input lever, such as a pivoted hand lever or a foot pedal. Rotation of the input lever, such as the rotation of a foot pedal in response to the application of a control force, causes an axial displacement of the valve spool and a resultant change in the position of the swashplate.

During the time that a control force is applied to the input lever, it is important that the control force be reacted so that a positive feedback force is developed to oppose rotation of the input lever and provide an operator with some measure of the amount of swashplate modulation which is occurring. The feedback force requirement commonly is satisfied by the use of a centering spring mounted on the control valve and interconnected between the valve spool and the control valve housing. Displacement of the valve spool generates an axial biasing force in the centering spring, such that the valve spool is biased toward a position representative of the no flow position of the swashplate. The centering force is transmitted through the input linkage to oppose the control force and urge the input lever to a position corresponding to the zero pump displacement position of the swashplate.

In order to close the servo control loop between the control valve and the swashplate, a feedback linkage interconnects the swashplate with the valve spool and is operative to convert the relative displacement of the swashplate and valve spool to a feedback force which counteracts the control force acting on the spool and holds the valve spool in a centered, steady-state fluid metering position.

It also is known to utilize a resilient override spring element in the input linkage to yieldably apply a force to the control valve in a manner which prevents an excessive manual force from being applied to the valve. In order to prevent excessive input force from being applied to the control valve during sudden control inputs, the override spring deflects and limits the force on the control valve. The force level at which the override spring deflects is a function of the stiffness and amount of initial compression of the override spring.

Deflection of the override spring also permits continued displacement of the input lever when the valve spool has reached a physical travel limit. The spring preload force must be sufficiently low to prevent excessive feedback force from being transmitted to the lever once a travel limit is encountered.

During operation of the pump, metal chips or particles may become lodged within the control valve and obstruct displacement of the valve spool. This is a particularly undesirable condition when the control valve is jammed in a position which holds the swashplate fixed in a maximum displacement condition. Input force can be applied rapidly to attempt to shear the particles and overcome the obstruction.

The use of an input lever-centering spring and an override spring in series presents a problem. In known devices, the torque which is applied to the input lever during normal operation of the device, that is, with the override spring not deflected, is determined largely by the stiffness of the centering spring. Normally, the force generated by the centering spring is just high enough to overcome friction between the valve spool and the valve housing and to center the input lever.

In some vehicle applications of hydrostatic pumps, however, it is desired to have a much higher centering spring torque on the input lever to provide greater force feedback to an operator of the input lever. If the centering spring stiffness is increased, the increased force level must be transmitted through the override spring, requiring that the torque level of the override spring be increased to prevent the override spring from deflecting during normal operation of the control. This requirement places a penalty on the control design in terms of the space required to house the override spring and in an increased input torque when the override spring deflects.

Another problem which exists in known devices is the inability to easily align the centered position of the valve spool with the corresponding "neutral" positions of both the input lever and the swashplate. The input linkage and the feedback linkage commonly are connected to the valve spool by means of a summing link, with the feedback linkage including a first link pivotally connected between the summing link and the swashplate, and the input linkage including a second link pivoted between the input lever and the summing link. The summing link, in turn, is pivoted to the valve spool. In order for the centered position of the valve spool to align with the corresponding neutral positions of both the input lever and the swashplate, the pivotal connections of the first and second links and the valve spool must lie along the summing link when the valve spool is in the centered position.

The alignment problem arises due to the fact that the centered position of the swashplate and the input lever are determined independently of the position of the summing link. The centered position of the swashplate is established during assembly of the pump and is maintained by a pair of swashplate centering springs symmetrically connected between the swashplate and the pump. The centered position of the input lever is also established by a centering spring, as previously described. Thus, the locations of the pivots on the first and second links specify the position of the summing link at the respective neutral positions of the input lever and swashplate. In order, then, to connect the summing link to the valve spool, it is necessary to adjust the axial position of the valve spool relative to the summing link and away from the centered spool position to line up the connection points on the valve spool and the summing link.

One approach to solving this problem has been to connect the summing link with the centered valve spool prior to connecting the input linkage with the summing link. The position of the summing link at a neutral condition then is determined by the centered position of the first link and the valve spool. The centered position of the input lever then is adjusted to conform with the prescribed summing link geometry. This proposal generates additional problems, however, in applications in which the input linkage includes an intermediate coupling which defines a non-linear response characteristic relationship between displacements of the input lever and the valve spool. By varying the neutral position of the input shaft, which in turn drives the coupling, the neutral position of the input lever is offset from the center of the predetermined response curve and results in unacceptable operating characteristics of the pump control.

This invention is directed toward overcoming the problems set forth above in a novel and useful way.

SUMMARY OF THE INVENTION

An object of this invention is to provide an improved manual displacement control for a variable displacement hydraulic pump which provides an input lever centering force which is independent of the force characteristics of an associated override spring. An adjustable connection is provided to facilitate the precise assembly of an input lever with the pump swashplate and a fluid-metering valve spool.

In an exemplary embodiment of the invention, a manual displacement control is provided for varying the position of a tiltable swashplate in a hydraulic pump. The pump is used in a hydraulic system which includes a source of control fluid, a servo mechanism coupled to the pump, and a control valve for metering control fluid to the servo mechanism to modulate the swashplate position. A resilient displacement control linkage transmits a command input from a manual input lever to an axially movable spool in the control valve. A feedback linkage interconnects the swashplate and the valve spool to transmit a feedback signal to the control valve and close the servo control loop.

The displacement control linkage has a non-linear coupling element and a resilient override spring serially connected between the input lever and the feedback means. An input link is driven by the lever and provides a displacement input to the non-linear control element. The non-linear coupling has an output link which is displaced in non-linear proportion to the input displacement. The override spring resiliently couples the output link with an intermediate link which, in turn, is connected to the valve spool to apply a yieldable force to the control valve in response to a displacement of the input lever.

A torsional centering spring is connected between the input lever and the override spring and generates a feedback force which opposes a control force applied thereto and urges the input lever to a position representative of the no flow position of the pump swashplate. Because the centering spring is positioned upstream of the override spring, it is possible to vary the feedback centering force applied to the input lever independently of the stiffness of the override spring.

An adjustable connection means is provided on the control valve for centering the valve spool while maintaining a corresponding neutral position of the input lever and swashplate during assembly of the displacement control. The adjustable connection means is constructed such that the zero or centered position of the input lever can be precisely aligned with the centered position of the non-linear coupling to ensure that manual displacements of the input lever cause the desired displacement of the output link of the non-linear coupling.

The adjustable connection means includes a threaded connector positioned between the valve spool and the displacement control linkage. A connector block is coupled to a threaded portion of the valve spool and is connected to the displacement control linkage. The valve spool has a flat end portion which engages a slotted rotatable element positioned at one end of the valve housing. An adjuster screw projects from the slotted element and extends through the valve housing, such that rotation of the adjuster screw causes relative axial displacement between the valve spool and the connector block to vary the relative axial position of the valve spool and the control linkage.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
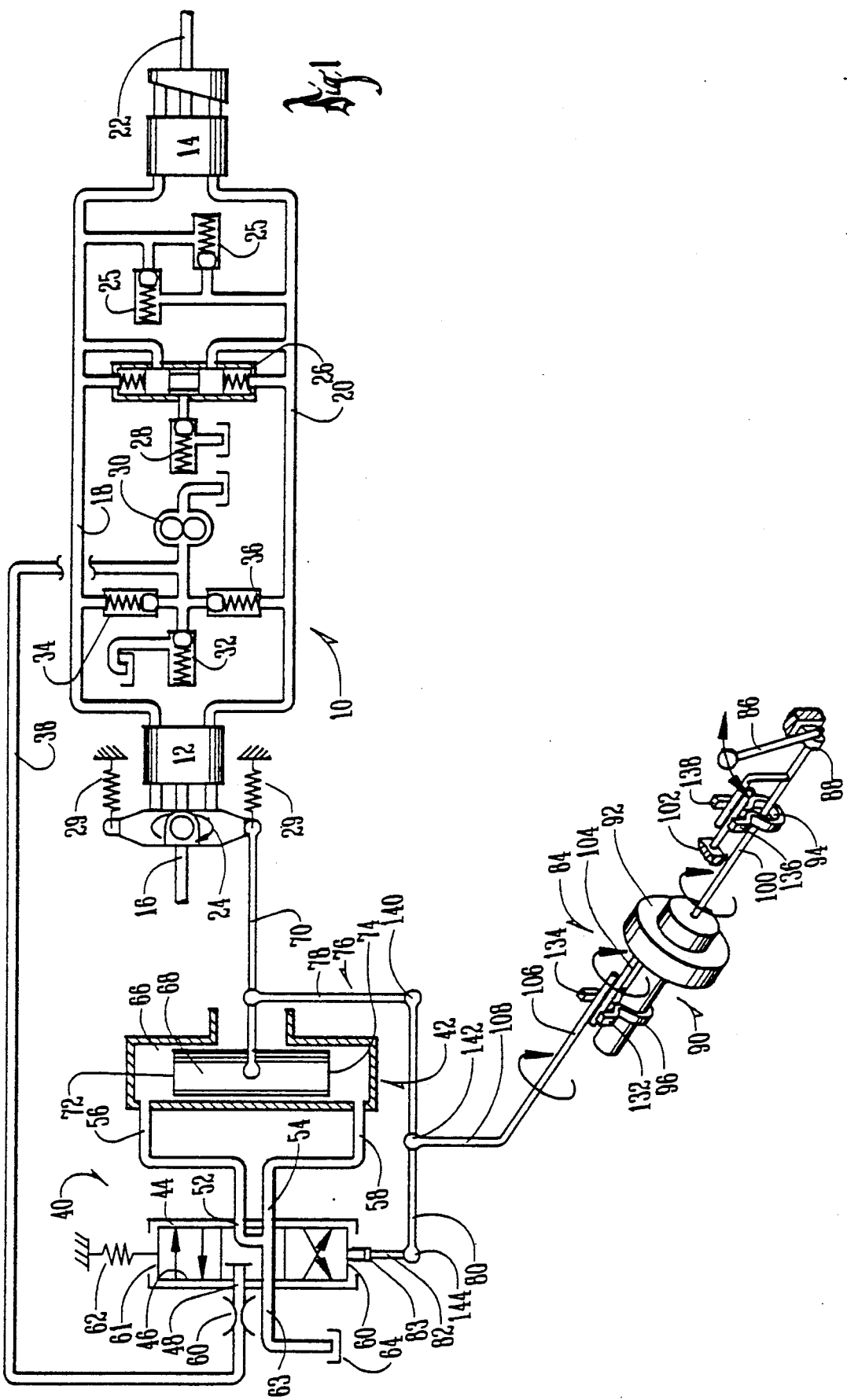
FIG. 1 a schematic illustration of a control circuit utilizing the present invention to control the displacement of a variable displacement pump.

Referring first to FIG. 1, a hydrostatic transmission, generally designated 10, includes a reversible variable displacement hydraulic unit 12 and a fixed displacement hydraulic unit 14. Hydraulic units 12 and 14 are axial piston devices, with hydraulic unit 12 functioning as a pump and hydraulic unit 14 functioning as a motor. The transmission is adapted to be driven by a prime mover or engine (not shown) through an input shaft 16 connected to pump 12. The pump is connected to motor 14 by main loop fluid lines 18 and 20 to transmit power from input shaft 16 to motor output shaft 22. An angularly positioned swash plate 24 on the pump modifies both the amount of flow and the direction of flow of the pump output in a known manner. Lines 18 and 20 are provided with high pressure relief valves 25, and a shuttle valve 26 is connected to a pressure relief valve 28. Swashplate centering springs 29 bias the swashplate toward a no flow, zero displacement position and will be clearly understood from the following discussion.

As is known, the transmission is provided with a charge pump 30 which is driven by input shaft 16. The output of charge pump 30 is controlled by a charge pressure relief valve 32 and flows through check valve 34 or 36 to either line 18 or 20, depending on which is at low pressure, to replenish lost hydraulic fluid to the transmission main loop. The output of the charge pump also is directed to a control fluid line 38.

Variable displacement pump 12 is provided with a displacement control valve 40 and servo means, generally indicated at 42, for varying the position of swashplate 24. Control valve 40 includes a stationary valve body 44 which defines an internal axial valve bore 46. An opening 48 is formed in the valve body to communicate control fluid in line 38 with the valve bore through a flow restricting orifice 50. The valve body also has a pair of openings 52 and 54 communicating with servo means 42 by servo lines 56 and 58, respectively. A movable valve spool 60 is located within valve bore 46 and may be axially displaced with respect to the valve bore to control flow to servo means 42. Stops 61 are positioned at each end of the valve body to limit displacement of valve spool 60, and a relatively light anti-backlash spring 62 applies an axial biasing force tending to oppose small deviations of the valve spool away from externally commanded positions. Also connected to the control valve is a tank line 63 in fluid communication with a tank or reservoir 64 at atmospheric pressure.

Servo means 42 includes a servo cylinder 66 having a movable piston 68 coupled with swashplate 24 by means of a mechanical servo link 70. Servo piston 68 is displaced axially within the servo cylinder in response to a differential pressure applied across opposite ends 72 and 74 of the piston through fluid lines 56 and 58, respectively.

Swashplate 24 is provided with feedback means 76 which includes a feedback link 78 connected to servo link 70 and a summing link 80 connected at one end to the feedback link and connected at another end to a link 82 which, in turn, is connected to valve spool 60 by an adjustable connector means 83, the details of which will be described below. A control input force yieldably is applied to the control valve by a resilient displacement control linkage, generally designated 84, for prescribing the axial position of valve spool 60. When an axial displacement is imparted to valve spool 60, fluid flow is initiated from control fluid line 38 to one of the servo lines 56 or 58 and thus to servo cylinder 66 to cause angular displacement of swashplate 24. The angular swashplate displacement imparts a corresponding movement to feedback linkage 76 which, in turn, closes the control loop by accurately maintaining a steady state fluid metering position of the valve spool such that a sufficient flow is supplied to the servo cylinder for maintaining swashplate 24 in an angular position corresponding to the manual command input.

Displacement control linkage 84 now will be described. As shown generally in FIG. 1, the displacement control linkage includes a manual input means including an input lever 86 pivotally mounted by a pin 88 and connected to summing link 80 by a resilient linkage 90. Linkage 90 has a non-linear coupling 92 interconnected between a first spring 94 and a second spring 96. First spring 94 is connected to the input lever and the non-linear coupling by a rotatable link 100. Spring 94 is a coiled torsional spring and has a pair of upstanding legs 136 and 138, with leg 136 contacting fixed pin 102. Rotatable link 100 contacts leg 138 of the spring, such that rotation of input lever 86 and link 100 distorts the spring 94 and generates a biasing return torque against the input lever. Spring 96 is connected operatively to non-linear coupling 92 by a rotatable link 104 and is coupled with control valve 40 by an interconnected pair of rotatable input links 106 and 108. Input link 108 is connected directly to summing link 80.

Figure 2:
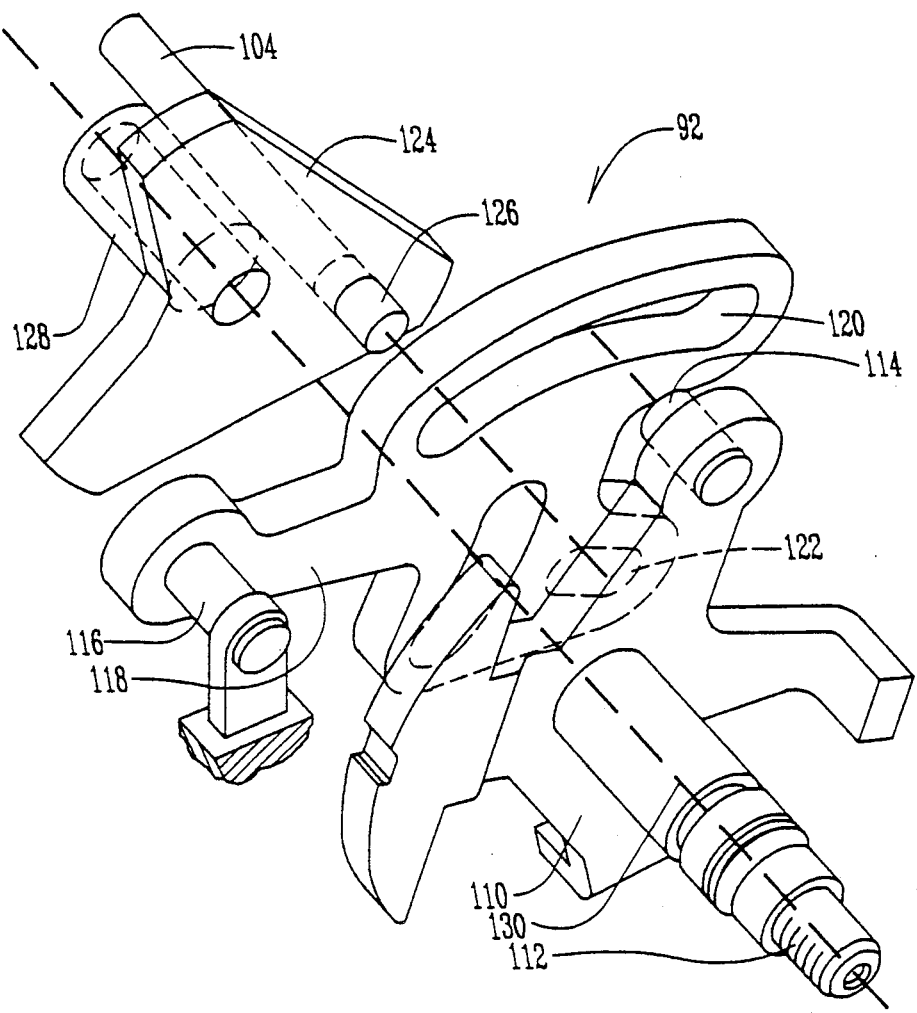
FIG. 2 is an exploded perspective view of the non-linear coupling of the present invention.

Non-linear coupling 92 is illustrated in detail in FIG. 2 and includes a first rotatable camming member 110 having an integral input shaft 112 for rotation with link 100 and an axially extending cam follower 114. A second rotatable member 116 is supported rotatably by a fixed pivot 118 and has an arcuate cam input slot 120 for receiving cam follower 114 on camming member 110. The second rotatable member also has a generally oval cam output slot 122. A third rotatable camming member 124 has a cam follower 126 extending into cam output slot 122, with output link 104 projecting in colinear relation with cam follower 126. A cylindrical hub portion 128 is formed integrally on camming member 124 and is coaxial with the axis of rotation 130 of the input shaft 112.

The above construction of coupling 92 can be understood to provide a non-linear relationship between an angular input displacement $\phi_1$ of input link 100 and an angular output displacement $\phi_2$ of output link 104 in the following manner. When input shaft 112 is rotated by lever 86, cam follower 114 moves within slot 120 to cause a rotation of camming member 116 about pivot 118. Due to the coupling between cam follower 126 and camming member 116, rotation of the camming member 124 and output link 104 results. The relationship between the rotation of input shaft 112 and link 104 results directly from the geometry of cam input slot 120 and the location of cam followers 114 15 and 126a.

Figure 3:
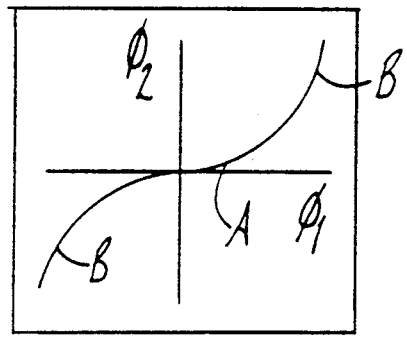
FIG. 3 is a graph illustrating the input-output response characteristics of the non-linear coupling of the present invention.

The graph in FIG. 3 illustrates the relationship between the input displacement $\phi_1$ of link 100 and the output displacement $\phi_2$ of link 104. The relatively low slope of the curve indicated at "A" represents the capability of non-linear coupling 92 to provide relatively small angular displacements of link 104 in response to input displacement $\phi_1$ of link 100 at small values of $\phi_1$, that is, near zero displacement of lever 86. Similarly, the relatively large slope of the curve indicated at "B"

indicates the capability of providing large output displacement $\phi_2$ of link 104 in response to input displacements $\phi_1$ of link 100 at larger displacements of lever 86.

Referring back to FIG. 1, spring 96 also is a coiled torsional spring with the coiled portion thereof surrounding cylindrical hub 128 projecting from non-linear coupling 92. Spring 96 has a pair of upstanding legs 132 and 134 which form a bifurcated connection between rotatable links 104 and 106, respectively. Spring 96 has an initial torsional preload prescribed by the distance between legs 132 and 134 and the inherent spring stiffness, such that initial movement of lever 86 results in the coupled rotation of links 104 and 106, with rotation of link 106 being opposed by a reaction force transmitted by summing link 80. The reaction force opposing the motion of the link 106 and the input force encouraging motion of link 104 act oppositely against legs 132 and 134 to establish a differential force couple which imparts a torque to spring 96. When the reaction force is great enough that the induced spring torque exceeds the initial torsional preload, spring 96 deflects to permit link 104 and input lever 86 to move independently of link 106. Such a condition occurs, for example, when valve spool 60 reaches a travel stop 61 and lever 86 is still further rotated. Rather than transmit sudden excessive force to the control valve, spring 96 operates to temporarily decouple links 104 and 106 until the input force/reaction force differential is reduced.

Figure 4:
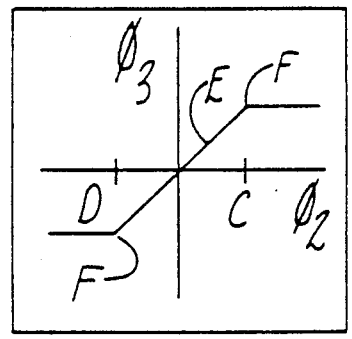
FIG. 4 is a graph illustrating the input-output response characteristics of the override spring of the present invention.

The graph shown in FIG. 4 illustrates the relationship between angular displacement $\phi_2$ of link 104 and the resulting angular displacement $\phi_3$ of link 106. In the range of operation in which the output displacement of link 104 extends between values "C" and "D", spring 96 has a linear response characteristic such that displacement $\phi_3$ of link 106 occurs simultaneously with displacement $\phi_2$ of link 104. When valve spool 60 encounters one of the valve stops 61 or otherwise is obstructed, link 106 is prevented from any further displacement in response to continued rotation of link 104. This condition is illustrated in FIG. 4 at "F" where displacement $\phi_3$ maintains a constant value and torsional spring 96 deflects in response to further output displacement of link 104. At this condition, input lever 86 can be moved independently of the pump swashplate position and spring 96 thus provides an input override function.

Figure 5:
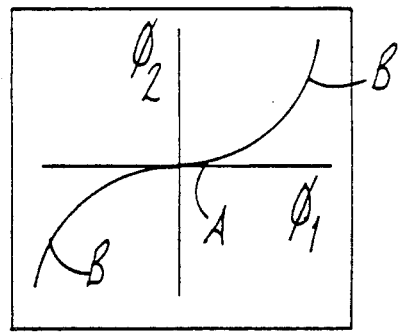
FIG. 5 is a graph illustrating the input-output response characteristics of the control valve and servo in the present invention.

The relationship between swashplate angle $\phi_5$ and the angular displacement $\phi_3$ of link 106 is illustrated in the graph of FIG. 5. As indicated in the graph at "G" and "H", swashplate 24 responds in substantially linear proportion to the angular displacement of link 106 in an operating range slightly off-center, that is, slightly offset from the zero position of link 106. The offset, generally indicated "I", represents a deadband range of operation of the swashplate in which deflection of lever 86 produces no change in position of the swashplate. The deadband range of operation of the swashplate corresponds to the range of initial movement of control valve spool 60 in which control fluid is not yet communicated to either of servo lines 56 or 58.

It is believed that operation of the displacement control linkage can be readily understood from the foregoing description and can be summarized as follows. In the absence of a control force applied to lever 86, swashplate 24 is maintained in a zero displacement position by centering springs 29 and pump 12 provides no flow to motor 14, such that the transmission 10 is in a neutral or idle position with no power being transmitted from input shaft 16 to motor output shaft 22.

Rotation of lever 86 about pivot pin 88 induces an angular input displacement $\phi_1$ of link 100 and a resulting angular displacement $\phi_2$ of link 104 through non-linear coupling 92. The practical significance of the response characteristics of the non-linear coupling illustrated in FIG. 3 is that for initial displacement of input lever 86 with the swashplate in the neutral position, link 104 is relatively nonresponsive and therefore can be prescribed with high resolution. More specifically, small displacements of link 100 produce even smaller displacements of output link 104. Displacements of swashplate 24 about the neutral position thus can be prescribed with a high degree of accuracy. This capability is particularly advantageous when transmission 10 is utilized in the drive train of a vehicle and it is desired to propel the vehicle at a low speed. At larger swashplate angles, where the vehicle is operating at relatively high speed, it is important that the swashplate respond quickly to command inputs. The increased slope "B" of the curve in FIG. 3 reflects such responsiveness for relatively large values of input displacement $\phi_1$.

Displacement of link 104 induces a force which is applied yieldably to the valve spool 60 by links 106 and 108. As described above, override spring 96 resiliently couples rotatable links 104 and 106 to translate displacement of input lever 86 into axial displacement of the valve spool. When a reaction force opposing displacement of the control valve spool cooperates with the input force to generate a torque on the spring in excess of the spring torsional preload, the spring deflects to allow independent motion of link 106. Thus, the value of the reaction force required to decouple the input lever from the swashplate is established by the initial preload of the override spring. For rapidly applied control inputs, the valve spool may engage the stops quite suddenly, with the override spring deflecting to effectively decouple the input lever and the valve spool and allow continued rotation of the lever. In this situation, it is desirable to prevent excessive reaction force from being transmitted to the input means, and the override spring preload accordingly is selected to achieve this end.

In addition to the above mentioned case in which a reaction force sufficient to decouple the input lever from the swashplate is generated when valve spool 60 encounters a stop 61, it is possible for an excessive reaction force to result when the valve spool otherwise becomes jammed in valve body 46. Small metal chips and other particles may become lodged in the control valve and prevent the valve spool from moving, causing the swashplate to be held in a fixed position. This situation is particularly undesirable when the swashplate is held in a wide-open or maximum displacement position.

In order to overcome the obstruction, a command input force is applied to lever 86 and transmitted through the displacement control linkage to move the valve spool and shear the particle within the valve body. The input force is applied to leg 132 of the override spring, and a reaction force transmitted through the feedback linkage is applied oppositely to leg 134 of the spring. As the input lever is displaced continuously, the input force attempting to shear the particle and the resulting reaction force gradually increase. When the differential force acting on the legs of the override spring exceeds the preload force of the spring, the spring deflects and the input lever becomes ineffective in increasing the chip shearing force. Because the torque preload of the spring is determinative in establishing the maximum input force level, the spring preload, therefore, also limits the amount of force which can be generated to overcome an obstruction of the valve spool. The spring must be appropriately selected to permit shearing metal chips of a maximum expected size while preventing excessive feedback force from being transmitted to the input lever when the valve spool engages a stop.

Figure 6:
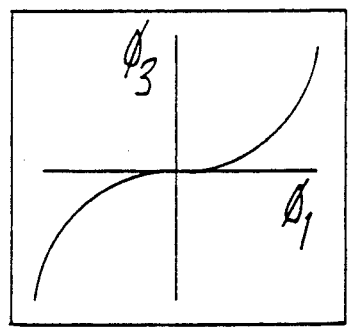
FIG. 6 is graph illustrating the cumulative input-output response characteristics resulting from a serial arrangement of the components represented in FIGS. 3–5.

FIG. 6 illustrates the relationship between displacement $\phi_1$ of input link 96 and the angular displacement $\phi_s$ of swashplate 24, and represents the cumulative response characteristics of the control elements described with respect to FIGS. 3 through 5. As shown in FIG. 6, swashplate 24 initially is nonresponsive to small input displacements of link 100 near the neutral position. The on-center nonresponsiveness is contributed by the deadband response illustrated in FIG. 5 and is desired to assure that small unintended displacements of manual lever 86 will result in no displacement of swashplate 24 with the pump in neutral and to stabilize the swashplate about the zero displacement position.

As the displacement of link 100 increases, the swashplate becomes increasingly responsive to displacements of lever 86. Due to the nonlinear response characteristics of coupling 92, precise control of the swashplate is obtained for small displacement away from the neutral position, providing the capability of "inching" the vehicle in which the transmission is utilized at a very low speed. At higher vehicle speeds, where inching is not required, the slope of the response curve increases and swashplate position becomes more sensitive to displacement of lever 86.

Spring 94 will be understood to provide an important centering function of the input link 100 and input lever 86. In some applications of hydrostatic transmissions, it is desired to have a relatively high centering torque on the input lever such that a large feedback force is supplied to an operator. Because the centering spring 94 is positioned upstream of the override spring 96, that is, between the override spring and the input lever, the centering force is not transmitted through the override spring, and the override spring can be sized independently of the centering torque requirements.

In order to maintain the symmetric response characteristics represented in the graph of FIG. 6, it is necessary that valve spool 60, feedback linkage 76, and displacement control linkage 84 be interconnected with the various links being accurately aligned to provide the appropriate kinematic relationships between input lever 86, valve spool 60 and swashplate 24. In other words, input lever 86 must be positioned in an orientation corresponding to a neutral flow position of the pump swashplate when the valve spool is centered in the control valve and does not supply any fluid to servo means 42. Although it is theoretically possible to manufacture the various links such that the apparatus will always be properly assembled, inevitable manufacturing tolerances can stack up or accumulate to prevent a reliably proper assembly. As described immediately below, adjustable connector means 83 provides the capability of precisely assembling the linkage in a novel manner.

Referring again to FIG. 1, feedback link 78 connects swashplate 24 with summing link 80 at a pivoting connection 140. Input link 108 connects displacement control linkage 84 with the summing link at a pivoting connection 142. The centered position of swashplate 24, as established by centering springs 29, thus establishes the location of connection 140 when the swashplate is in a neutral position. Similarly, the centered position of input lever 86, as established by centering spring 94, establishes the location of connection 142 when the input lever is in a position representative of the neutral position of the swashplate. The prescribed positions of connections 140 and 142 therefore establish the position of summing link 80 when the pump is at a no flow condition. Summing link 80 is connected to the valve spool at a pivoting connection 144. It is a principal function of adjustable connector means 83 to permit the pivotal connection between the "centered" summing link 80 and the valve spool while the valve spool is centered within control valve 40. Structure adapted to provide such a function is illustrated in FIG. 7.

Figure 7:
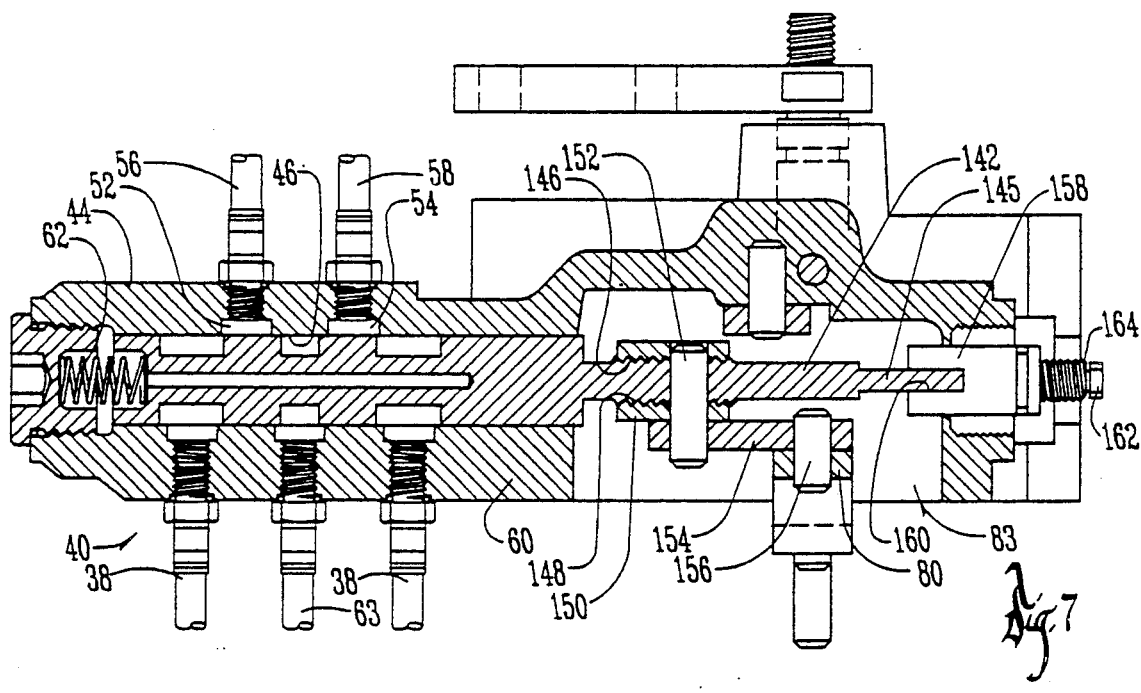
FIG. 7 is a sectional view illustrating the adjustable connector means of the above invention.

As shown in FIG. 7, valve spool 60 has a reduced diameter portion 142 which terminates in a flat end 15. Threads 146 are formed on the periphery of valve spool portion 143 and adjustably engage mating threads 148 formed on the inner wall of a cylindrical connector block 150. Relative rotation of the connector block and the valve spool thereby results in the axial advancement of the connector block along the spool.

A pin 152 projects transversely through one sidewall of the connector block and engages one end of a connector link 154. The connector link is joined at an opposite end to summing link 80 by a pin 156. Pin 156 thus embodies the pivotal connection 144 illustrated in FIG. 1. Rotation of the valve spool relative to the connector block, and corresponding axial displacement of the valve spool, provides the means for adjusting the position of the valve spool relative to the summing link.

In order to rotate the valve spool relative to the connector block, end 145 of the valve spool is received in a slotted coupling 158. The slotted coupling is supported rotatably at one end of valve body 44 and has an axially opening slot 160 and a threaded adjuster screw 162 projecting through the valve housing. Flat end 145 is constrained rotatably in slot 160 but is free to move axially therein, such that axial displacement of the valve spool is not restricted. Rotation of the slotted coupling and the valve spool is performed by turning the adjuster screw 162. A lock nut 164 secures the angular position of the slotted coupling and the valve spool.

Interconnection of valve spool 60 and summing link 80 can be summarized as follows. With both feedback link 76 and input link 108 connected to the summing link and the valve spool disconnected from the summing link, centering springs 29 and 94 center swashplate 24 and input lever 86, respectively, and thereby establish the location of pivotal connection 144 on the summing link. Valve spool 60 then is manually displaced within the valve housing until the end of coupling link 154 is aligned with the pivotal connection 144. Pin 156 then is threaded through the coupling link and the summing link to interconnect the valve spool and the summing link. At this point, valve spool 60 conceivably is displaced slightly from a centered position within bore 46.

In order to move the valve spool to a centered position within housing 44 whereat the flow of pressurized control fluid to servo means 42 is shunted, adjuster screw 162 is rotated manually. Because valve spool end 145 is constrained within slotted coupling 158, rotation of the adjuster screw and the slotted coupling applies a torque to the valve spool. Centering springs 29 and 94 maintain the position of the swashplate and input lever, respectively, such that summing link 80 is fixed in a neutral position while torque is applied to the valve spool. Connector block 150 is constrained from moving by the fixed summing link, and the rotation of the valve spool induced by the applied torque causes the valve spool to advance axially through the connector block. The adjuster screw is rotated continuously until the valve spool is centered within the housing. It should be understood that the valve spool can be axially advanced in two opposite directions, depending on the direction which the adjuster screw is rotated.

In practice, centering of the valve spool is accomplished by operating the transmission with the input lever in the position corresponding to the neutral position of the swashplate. If hydraulic control fluid accumulates in servo cylinder 46, indicating that the valve spool is not centered accurately within the valve housing, the adjuster screw is rotated and the transmission again is operated. This process is repeated until no control fluid accumulates in the servo cylinder.

Because the width of the lands formed on the valve spool is greater than the width of the openings 52 and 54 (see FIG. 7) in the control valve, the "centered" position of the valve spool actually corresponds to a range of positions in which control fluid is shunted from the servo cylinder. This range of positions can be considered a "neutral band". Rotation of the adjuster screw thus advances the valve spool through the control valve to establish a first axial limit on the neutral band of valve spool positions in which no control fluid is metered to the servo cylinder.

To establish the second limit of the neutral band, the adjuster screw then is rotated further in the first direction while the transmission is operating in neutral, that is, with the input lever in a position corresponding to the no flow position of the swashplate. While the valve spool is advancing through the range of shunting positions, no control fluid accumulates in the servo cylinder. When the valve spool reaches the opposite limit of the neutral band, control fluid appears in the servo cylinder. At that point, the total angular displacement of the adjuster screw required to axially advance the valve spool through the neutral band is established.

To precisely center the valve spool in the neutral band, the adjuster screw first is rotated to the position corresponding to the first limit of the neutral band determined by the above procedure. The adjuster screw then is rotated an amount calculated as one half the total rotation of the screw required to advance the valve spool through the entire neutral band to place the valve spool at the exact center of the neutral band. Because the summing link remains stationary during the adjustment process, the input lever and swashplate remain in a neutral position while the valve spool is centered precisely.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A manual displacement control for a variable displacement hydraulic pump having a tiltable swashplate movable to a neutral position wherein the pump has a zero displacement, the pump being a component in a hydraulic system having a source of control fluid, servo means coupled to the pump for varying the displacement thereof, and a control valve having an axially movable spool coupled with the swashplate for metering fluid to the servo means, the displacement control comprising:
   manual input means having a neutral position representative of the neutral position of the swashplate;
   input linkage means interconnecting the manual input means and the control valve for effecting an axial displacement of the valve spool in response to a commanded manual displacement of the input means;
   feedback linkage means responsive to a displacement of the swashplate for applying a force to the valve spool opposed to the commanded axial displacement of the valve spool;
   summing linkage means interposed between the input linkage means and the feedback linkage means and the valve spool;
   means for adjusting the position of the valve spool relative to the position of the summing linkage means when the swashplate and the manual input means are in the respective neutral positions thereof;
   coupling means operatively associated with the linkage means for establishing a non-linear relationship between a commanded displacement of the manual input means and a resulting axial displacement of the valve spool; and
   centering means interposed between the manual input means and the coupling means for applying a biasing opposing the commanded displacement of the manual input means.

2. A manual displacement control for a variable displacement hydraulic pump having a tiltable swashplate movable to a neutral position wherein the pump has a zero displacement, the pump being a component in a hydraulic system having a source of control fluid, servo means coupled to the pump for varying the displacement thereof, and a control valve having an axially movable spool coupled with the swashplate for metering fluid to the servo means, the displacement control comprising:
   manual input means having a neutral position representative of the neutral position of the swashplate;
   linkage means interconnecting the manual input means and the control valve for effecting an axial displacement of the valve spool in response to a commanded manual displacement of the input means;
   means for adjustably interconnecting the valve spool and the linkage means;
   coupling means operatively associated with the linkage means for establishing a predetermined relationship between a commanded displacement of the manual input means and a resulting axial displacement of the valve spool in response thereto; and
   means for generating a centering force adapted to urge the manual input means toward the neutral position thereof.

3. The manual displacement control of claim 2 including an override spring cooperating with the linkage means and having a stiffness adapted to permit the valve spool to move independently of the input means when a predetermined level of override spring force is exceeded, the means for generating a centering force being selected to apply a force to the input means which is independent of the stiffness of the override spring.

4. The manual displacement control of claim 2 in which the means for adjustably interconnecting the valve spool and the linkage means include means for constraining angular displacement of the valve spool relative to the control valve and means for allowing axial displacement of the valve spool relative to the control valve.

5. A manual displacement control for a variable displacement hydraulic pump in a hydraulic system having a source of control fluid, servo means coupled to the pump for varying the displacement thereof, and a control valve having an axially movable spool for metering control fluid to the servo means, the displacement control comprising:
  manual input means;
  linkage means interconnected between the manual input means and the control valve;
  resilient means operatively associated with the linkage means for applying a yieldable force to the valve spool in response to a commanded displacement of the manual input means; and
  centering means interposed between the manual input means and the resilient means for applying a biasing force opposing the commanded displacement of the manual input means.

6. The manual displacement control of claim 5 including means for adjusting the position of the valve spool relative to the position of the linkage means when the swashplate and the manual input means are in a respective position representative of a zero displacement of the hydraulic pump.

7. The manual displacement control of claim 5 in which the input means comprises a rotatable lever remotely positioned such that a manual angular displacement of the lever causes an axial displacement of the valve spool, the centering means comprising a resilient member interconnected between a fixed support and the input lever.

8. The manual displacement control of claim 7 in which the centering means comprises a torsional spring.

9. The manual displacement control of claim 5 including coupling means interposed between the resilient means and the centering means and cooperating with the linkage means to establish a predetermined relationship between a commanded manual displacement of the input means and a resulting axial displacement of the valve spool.

10. The manual displacement control of claim 9 in which the relationship established by the coupling means is a non-linear relationship.

11. A manual displacement control for a variable displacement hydraulic pump having a tiltable swashplate movable to a neutral position wherein the pump has a zero displacement, the pump being a component in a hydraulic system having a source of control fluid, servo means coupled to the pump for varying the displacement thereof, and a control valve having an axially movable spool coupled with the swashplate for metering fluid to the servo means, the displacement control comprising:
  manual input means having a neutral position representative of the neutral position of the swashplate;
  linkage means interconnected between the manual input means and the control valve;
  means for effecting the interconnection of the valve spool and the linkage means when the valve spool and the swashplate and the manual input means are in the respective neutral positions thereof; and
  coupling means operatively associated with the linkage means for establishing a predetermined relationship between a commanded displacement of the manual input means and a resulting axial displacement of the valve spool.

12. The manual displacement control of claim 11 in which the coupling means comprises a plurality of interconnected rotary cams.

13. The manual displacement control of claim 11 including override means operatively associated with the linkage means for applying a yieldable force to the valve spool in response to the commanded displacement of the manual input means.

14. The manual displacement control of claim 13 including centering means interposed between the manual input means and the override means for applying a force adapted to urge the manual input means toward the neutral position thereof.

15. The manual displacement control of claim 11 in which the means for effecting the interconnection of the valve spool and the linkage means includes a threaded connection between the linkage means and the valve spool.

16. The manual displacement control of claim 15 in which threads are formed along a portion of the valve spool and in which the threaded connection includes a connector block having a threaded opening for receiving the threaded portion of the valve spool and is connected to the linkage means, rotation of the valve spool relative to the connector block causing axial separation of the valve spool and the connector block.

17. The manual displacement control of claim 16 including means for adjusting the axial position of the valve spool within the connector block.

18. The manual displacement control of claim 17 in which the valve spool has a flat extension formed at an end thereof, the means for adjusting the axial position of the valve spool within the connector block including a rotatable element having a slot for receiving the flat valve spool extension.

19. The manual displacement control of claim 18 including means for maintaining the angular position of the rotatable element.

* * * * *